Feb. 16, 1954
H. HEUSCHMANN
2,669,604
METHOD OF AND MEANS FOR DETERMINING DEVIATIONS
IN THE AMOUNT OF FREQUENCY VARIATION BETWEEN
TELEGRAPH TRANSMITTERS AND RECEIVERS
Filed Nov. 29, 1950
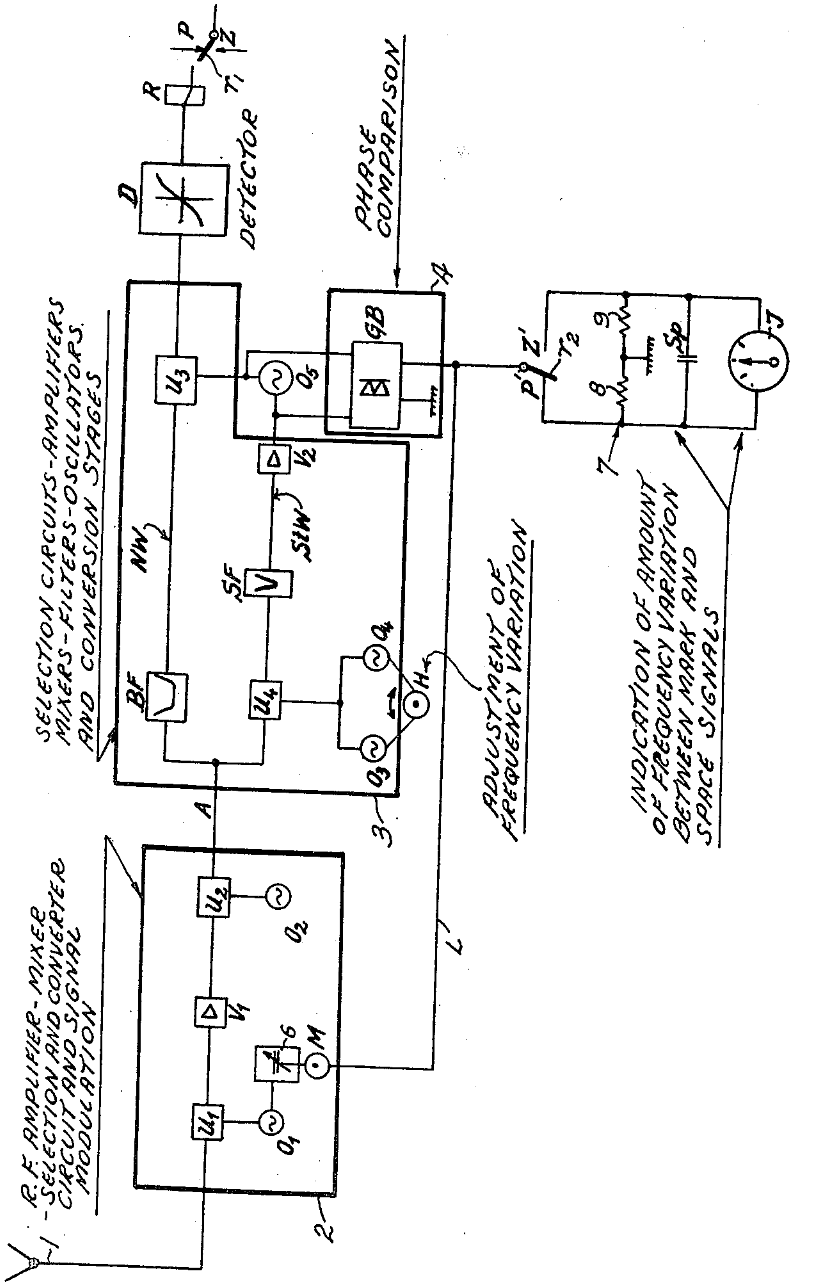
Inventor:
Hans Heuschmann.
By. [signature] Atty.

Patented Feb. 16, 1954

2,669,604

UNITED STATES PATENT OFFICE 2,669,604

METHOD OF AND MEANS FOR DETERMINING DEVIATIONS IN THE AMOUNT OF FREQUENCY VARIATION BETWEEN TELEGRAPH TRANSMITTERS AND RECEIVERS

Hans Heuschmann, Berlin-Spandau, Germany, assignor to Siemens & Halske, Aktiengesellschaft, Munich and Berlin-Siemensstadt, Germany, a German corporation Application November 29, 1950, Serial No. 198,104

6 Claims. (Cl. 178—69)

This invention is concerned with a method of and means for determining the amount of frequency variation between frequency-keyed telegraph transmitters and receivers.

In the coaction with frequency-keyed transmitters which transmit mark signals with a certain frequency and space signals with another frequency, there is provided at the receiver a device comprising two oscillators, which determines the correct position of the two telegraphic frequencies as described, e. g., in the patent to H. O. Peterson, No. 2,341,649. The frequencies of the two oscillators differ by the amount of frequency variation of the transmitter. If the frequency difference of the two oscillators does not correspond to the amount of frequency variation of the transmitter, a frequency readjustment becomes automatically operative incident to the keying from space to mark signals, and vice versa.

The drawback of the known apparatus is that it does not provide means for indicating the difference between the two oscillator frequencies and particularly means for indicating whether the amount of the frequency variation should be decreased or increased.

The object of the invention is to provide improvements in the receiver to remedy this shortcoming. This object is realized by deriving a control frequency from the two alternately received frequencies, comparing this control frequency with a normal frequency generated in the receiver, and providing a control device for receiving the voltage values resulting from the comparison, in a sequence corresponding to the mark and space signals received, the control device in turn supplying a control voltage for actuating an instrument which designates the directions of the amounts of frequency variations. The frequencies of the two oscillators may then be adjusted in accordance with the indications of said instrument.

Details of the invention will appear from the following description which will be rendered with reference to the accompanying drawing showing in schematic representation an example of an embodiment of receiver means coacting with a frequency-keyed telegraphic transmitter and comprising the novel control means outlined above.

The amount of the frequency variation of the transmitter may be, e. g., 1000 cycles, the frequency employed for the transmission of mark impulses being in this case on the order of 4 megacycles, and the intervals between the mark signals being of a frequency of 4.001 megacycles. The incoming signal frequencies are received at the receiver on the antenna 1. The apparatus indicated within the enclosures 2, 3, 4 shown in prominent full lines corresponds to known apparatus described, e. g., in the previously mentioned Peterson Patent No. 2,341,649 with the exception of the oscillator $O_5$ which is used in the present invention for generating a normal frequency. The incoming signals are in known manner converted in the stages $U_1$ and $U_2$ by successive heterodyning with oscillations from the oscillators $O_1$ and $O_2$ so that frequencies of 14.5 kilocycles and 15.5 kilocycles appear at the line A incident to the receipt of the mark and of the space signals, respectively. The heterodyned frequencies are further converted in the signal circuit portion NW, including a band filter BF with a pass frequency of 14 . . . 16 kilocycles and a conversion stage $U_3$, to produce frequencies of 2 . . . 4 kilocycles, and the latter are conducted to a known detector D which may be tuned, e. g., to 3 kilocycles. The direct voltages from the detector D affect a telegraph relay R so that its armatures or contacts $r_1$ and $r_2$ are placed in the illustrated resting positions P, P′ responsive to the space signals while they are actuated to assume the alternate working positions Z, Z′ responsive to the mark signals. In addition to the signal circuit portion NW, there is provided a control circuit portion StW which includes a conversion stage $U_4$ cooperating with two oscillators $O_3$ (27.5 kilocycles) and $O_4$ (26.5 kilocycles) so as to accomplish a conversion of the received frequencies of 14.5 kilocycles and 15.5 kilocycles, respectively, among others into the frequency position (26.5—14.5 and 27.5—15.5, respectively) of 12 kilocycles. This control frequency of 12 kilocycles is conducted to the serially related filter SF having a narrow pass region of 12 kilocycles ±100 cycles and serves after amplification at $V_2$ for the locking of a 12-kilocycle oscillator $O_5$ whose frequency is conducted to the conversion stage $U_3$ in the signal circuit portion NW. The control frequency of 12 kilocycles thus obtained from the mark and the space signals is also conducted, together with the normal frequency produced by the locked oscillator $O_5$, to a known phase-comparison device GB. If there is for any cause a difference between the control frequency derived from the signals and the normal frequency produced by the oscillator $O_5$, a direct voltage will be produced by the phase-comparison device GB which is in known manner conducted to the receiver portion 2 over the line L for adjusting the frequency of the modulator 6 by affecting the motor M associated therewith. The direct voltages thus resulting from the signals are also conducted to the new control device 7 over the contact $r_2$ of the telegraph relay R and the resistors 8 and 9 associated with its space and mark positions, respectively, to cause charging of the storage element Sp which delivers corresponding direct voltage impulses to the instrument J so as to cause deflection of the pointer thereof to the right or to the left, depending on the polarity of the impulses. The operating personnel is thus informed whether the amount of the frequency variation should be increased or decreased.

The adjustment corresponding to such indication may be carried out by means of the device H which is in accordance with the invention provided to adjust the frequency of the oscillators $O_3$ and $O_4$ directly in the proper direction in accordance with the indication of the instrument J. An adjustment of the filter means included in the detector D may be simultaneously carried out if desired, for the purpose of approximating it to the amount of frequency variation which had been determined.

If it is, for example, assumed that the mark signal frequency is at the line A of the receiver 14.6 kilocycles instead of 14.5 kilocycles, while the space signal frequency has remained unchanged at 15.5 kilocycles—the amount of frequency variation now being 900 cycles—there will result at the moment of occurrence of the mark impulse at the output of filter SF a mark signal control frequency of 11.9 kilocycles, such control frequency thus reflecting the amount of frequency variation of said signal frequencies. When this control frequency is compared in the phase-comparison device GB with the normal frequency of 12 kilocycles from the oscillator $O_5$, there will result from such comparison of the two frequencies, e. g., a positive direct voltage which charges the storage element Sp in the working position Z′ of the contact $r_2$, thus producing an impulse for the instrument J to cause the pointer thereof to be deflected to the right. The operating personnel now knows that the amount of frequency variation must be reduced. The frequency-determining means H of the oscillators $O_3$ and $O_4$ is correspondingly adjusted in the proper direction until the instrument J indicates "0." In accordance with the amount of frequency variation of 900 cycles, which now obtains, the oscillator $O_3$ will oscillate with 27.45 kilocycles and the oscillator $O_4$ with a frequency of 26.55 kilocycles. On the other hand, if the mark signal frequency amounts to 14.4 kilocycles (amount of frequency variation=1100 cycles) in the presence of unaltered space signal frequency of 15.5 kilocycles, there will be at the output of the filter SF a control frequency of 12.1 kilocycles, again reflecting the amount of frequency variation of the two signal frequencies, from which results, after comparison with the normal frequency of 12 kilocycles, at the phase-comparison device GB, a direct voltage of opposite polarity. This direct voltage is conducted to the control device 7 in the working position Z′ of the contact $r_2$, and the storage element Sp will now deliver a control voltage of opposite polarity which causes a deflection of the instrument J in opposite direction. The operating personnel is thus informed that the amount of frequency variation is to be increased by the adjustment of the frequency-determining means H of the oscillators $O_3$ and $O_4$. If desired, the corresponding adjustment may be accomplished by automatic means under control of the control voltage resulting at any given time.

The operations are similar in the case of frequency variations caused by variations in the space signal frequency. A control frequency occurs in this case at the phase-comparison device GB responsive to the space signal frequency which differs from the normal frequency and which places, in the resting position P′ of contact $r_2$, a corresponding direct control voltage on the control device 7. The storage element Sp then delivers in similar manner a control voltage with a polarity which will indicate on the instrument J the amount of frequency variation (decrease or increase) thus indicating the adjustment that is to be effected at the device H as described before or which may be employed, as in the former case, for effecting the desired adjustment automatically.

The arrangement operates similarly in the case of simultaneously occurring frequency variations of the space and the mark signal frequencies. The deflection of the instrument J to one or the other side will make it possible, in all such cases, to recognize the direction of the frequency variation and to undertake adjustment immediately in the proper direction, either by hand or automatically, by suitable adjusting means.

Changes may be made within the scope and spirit of the appended claims.

I claim:

1. In the art of signalling with frequency-keyed telegraph transmitters and receivers therefor wherein different signal frequencies are alternately transmitted to designate mark and space signals, respectively, the method of determining at the receiver deviations in the amount of frequency variation between said signals comprising generating a predetermined normal frequency; producing from the alternately received mark and space signal frequencies a control frequency which reflects the amount of frequency variation of said signal frequencies; comparing said control frequency with said normal frequency; utilizing the differences between said control frequency and said normal frequency for generating direct current voltages of predetermined polarities; accumulating the charges of said direct current voltages; switching said accumulated charges in accordance with the sequence of said mark and space signal frequencies, respectively, to produce control voltages; and indicating the directions of said control voltages to indicate deviations of the amounts of frequency variation.

2. In the art of signalling with frequency-keyed telegraph transmitters and single side band receivers therefor wherein different frequencies are alternately transmitted to designate mark and space signals, respectively, the method of determining at the receiver deviations in the amount of frequency variation between said signals comprising producing from the alternately received mark and space signal frequencies a predetermined control frequency; generating a predetermined normal frequency; adding said normal frequency to said received signal frequencies; comparing said control frequency with said normal frequency to produce predetermined voltage values; utilizing said voltage values in a sequence corresponding to the sequence of said mark and space signals to produce control voltages; and utilizing said control voltages to indicate the directions of the deviations of the amounts of frequency variations.

3. In a receiver co-operating with a frequency-keyed transmitter which transmits thereto alternately different frequencies designating mark and space signal frequencies, respectively, apparatus for determining deviations in the amount of frequency variation between said signals and for adjusting said amount of frequency variation comprising means for producing from the alternately received signal frequencies a control frequency, means for producing a predetermined normal frequency, means for comparing said control frequency with said normal frequency to produce voltage values, a control device, said control device comprising accumulating means for receiving the electrical charges of said voltage values in a sequence which corresponds to the sequence of transmission of said mark and said space signal frequencies to produce corresponding control voltages, indicating means adapted for receiving said control voltages and also adapted for indicating the direction of required adjustment of the amount of frequency variation in accordance with the polarity of said control voltages, and means for carrying out said adjustment.

4. In a receiver co-operating with a frequency-keyed transmitter which transmits thereto alternately different frequencies designating mark and space signal frequencies, respectively, apparatus for determining deviations in the amount of frequency variation between said signals and for adjusting said amount of frequency variation comprising means for producing a predetermined normal frequency, means forming a conversion stage including a pair of oscillators which differ by the amount of frequency variation of said receiver, said conversion stage being operative to cause conversion of the received mark signal frequency to produce a first auxiliary frequency and to cause conversion of the received space signal frequency to produce a second auxiliary frequency, narrow pass filter means cooperating with said stage for filtering said auxiliary frequencies to produce a control frequency, means for comparing said normal frequency with said filtered control frequency to produce voltage values, a control device, said control device comprising accumulating means for receiving the electrical charges of said voltage values in a sequence which corresponds to the sequence of transmission of said mark and said space signal frequencies to produce corresponding control voltages, indicating means adapted for receiving said control voltages and also adapted for indicating the direction of required adjustment of the amount of frequency variation in accordance with the polarity of said control voltages, and means operatively connected to said pair of oscillators for carrying out said adjustment.

5. In a single side band receiver co-operating with a frequency-keyed transmitter which transmit thereto alternately different frequencies designating mark and space signal frequencies, respectively, apparatus for determining deviations in the amount of frequency variation between said signals comprising means for generating from the alternately received signal frequencies a control frequency, an oscillator for generating a normal frequency, said oscillator being locked with the generation of said control frequency, means for comparing said control frequency with said normal frequency to produce voltage values, a control device for receiving said voltage values in a sequence corresponding to the sequence of transmission of said mark and said space signal frequencies to produce corresponding control voltages, and means for receiving said control voltages and for indicating the directions of deviations from the amount of frequency variation.

6. In a telegraph receiver co-operating with a transmitter which transmits thereto alternately different frequencies designating mark space signal frequencies, respectively, apparatus for determining deviations between said transmitter and said receiver relative to the amount of frequency variation of said signals comprising a pair of oscillators which differ by the amount of frequency variation of said receiver for producing from the received mark and space signal frequencies a control frequency, means for generating a predetermined normal frequency, means for comparing said normal frequency with said control frequency to produce voltage values, a control device, means for connecting said voltage values to said control device in accordance with the sequence of the received mark and space signals, respectively, for causing said control device to produce a directional control voltage, means for indicating the direction of said control voltage, and means for adjusting the operation of said pair of oscillators in accordance with the indicated direction of said control voltage until the frequency difference between said oscillators equals the amount of frequency variation between the received mark and space signal frequencies.

HANS HEUSCHMANN.

References Cited in the file of this patent

UNITED STATES PATENTS

| Number | Name | Date |
|---|---|---|
| 2,211,750 | Humby et al. | Aug. 20, 1940 |
| 2,341,649 | Peterson | Feb. 15, 1944 |
| 2,356,390 | Finch | Aug. 22, 1944 |